(12) United States Patent
Steger

(10) Patent No.: US 7,091,876 B2
(45) Date of Patent: Aug. 15, 2006

(54) METHOD FOR ADDRESSING THE USERS OF A BUS SYSTEM BY MEANS OF IDENTIFICATION FLOWS

(75) Inventor: Roland Steger, Weil Im Schoenbuch (DE)

(73) Assignee: Elmos Semiconductor AG, Dortmund (DE)

( * ) Notice: Subject to any disclaimer, the term of this patent is extended or adjusted under 35 U.S.C. 154(b) by 0 days.

(21) Appl. No.: 10/506,297

(22) PCT Filed: Mar. 29, 2003

(86) PCT No.: PCT/EP03/03302

§ 371 (c)(1),
(2), (4) Date: Feb. 16, 2005

(87) PCT Pub. No.: WO03/094001

PCT Pub. Date: Nov. 13, 2003

(65) Prior Publication Data

US 2005/0132109 A1 Jun. 16, 2005

(30) Foreign Application Priority Data

May 2, 2002 (DE) .............................. 102 19 716

(51) Int. Cl.
*H04Q 9/00* (2006.01)
(52) U.S. Cl. .................................. 340/825.52
(58) Field of Classification Search ............... None
See application file for complete search history.

(56) References Cited

U.S. PATENT DOCUMENTS 4,438,434 A * 3/1984 Wason ................... 340/825.51
4,785,285 A * 11/1988 Teich et al. ................. 340/518
4,842,085 A * 6/1989 Lang ........................... 177/164
5,226,123 A * 7/1993 Vockenhuber ............... 710/316
5,450,072 A * 9/1995 Vockenhuber .......... 340/825.52
5,831,546 A * 11/1998 Costa et al. ........... 340/825.52

FOREIGN PATENT DOCUMENTS

| EA | 0 489 346 A | 6/1992 |
| EA | 0 980 165 A | 2/2000 |
| WO | WO-00/04428 A | 1/2000 |

* cited by examiner

*Primary Examiner*—John R. Cottingham
*Assistant Examiner*—Matthew Spittle
(74) *Attorney, Agent, or Firm*—Birch, Stewart, Kolasch & Birch, LLP

(57) ABSTRACT

The method is provided for addressing the participants of a bus system comprising a control unit, a bus starting from the control unit and a plurality of participants connected to the bus. In the method, each participant not addressed so far feeds an identifying current for identification purposes into the bus, wherein all identifying currents flow through the bus towards the control unit. Each participant not addressed so far detects the current flowing through the bus. Only that participant not addressed so far, which does not detect any current or merely detects a current which is smaller than a predeterminable first threshold value, is identified as a participant not addressed so far. An address for addressing purposes is assigned to the participant thus identified. The aforementioned steps are carried out, without the respective participant addressed last, until all participants not addressed so far are addressed.

9 Claims, 17 Drawing Sheets

METHOD FOR ADDRESSING THE USERS OF A BUS SYSTEM BY MEANS OF IDENTIFICATION FLOWS

The invention relates to the addressing of participants of a bus system comprising a control unit, a bus starting from the control unit and a plurality of participants which are sequentially connected to the bus.

For minimizing the wiring complexities, for example in vehicles, it is more and more common practice to transmit the control signals for driving actuating elements via a bus to which, besides a control unit, the drive units for the actuator devices of the individual participants are connected. Combined to form a bus system are, for example, the actuator devices of a vehicle air conditioner, the window lift or the front seats of a vehicle. To enable the control unit to selectively drive one or a plurality of actuators, addresses are assigned to said actuators.

In previous systems the addresses have been assigned to the participants in that they have been stored by programming, assigned via daisy chain, plug or PIN coding, or by sequential connection of the participant and allocation of the addresses after connection of a participant.

While programming is relatively unproblematic during the manufacture of a vehicle, this is more complicated when the overall participant, i. e. the actuator device plus the drive unit, is, for example, replaced in a repair shop. Further, with regard to the logistics it is necessary that defined placement sequences are adhered to, which involves service inconvenience and the supply of pre-programmed (pre-addressed) components, which runs counter to the identical-part principle. The plug coding involves high costs due to the mechanical expenditure, and with regard to the stored address or the pin coding the logistics is complex since in this case no longer identical parts are involved such that these parts are no longer easily interchangeable. In the case of a daisy chain it is possible to realize the self-addressing of the participants of a bus system via switches for serially separating the bus connections between the participants. The drawbacks encountered in this regard are in particular the electrical disconnection of the bus line via active components and the large space requirement for bus systems which comprise a lot of participants.

In the conventional method problems are encountered, for example in respect of:
  batch variations,
  different technologies/manufacturers/setup of the electronic evaluation unit,
  temperature influences,
  level shifts for VDD and GND,
  foreign participants, i. e. participants which do not partake in the evaluation process but are connected to the bus at any place and are thus not compatible with the address allocation process.

Automated address allocation methods for bus systems are known from EP-A-0 854 609, DE-A-196 47 668, DE-C-44 04 962, DE-A-44 28 502, WO-A-97/45983 and DE-A-197 56 564.

Finally, from DE-C-40 38 992 a method is known where the addresses of the components of a danger-warning system are automatically assigned. Addressing is effected from the participant arranged closest to the central unit to the participant arranged farthest away from the central unit. Each participant comprises a resistor in each of the two wires of a warning-system primary line, and a plurality of electrical and electronic components between the two wires. Further, each participant is provided with a short-circuit switch for short-circuiting the two wires. When a switch is short-circuited, the voltage drop across the two aforementioned resistors (with a measuring current being impressed onto the warning-system primary line) can be measured. All participants are arranged in series in the warning-system primary line.

At the beginning of the addressing process a central control unit transmits a short-circuit signal for closing the short-circuit switches of all participants which have not been addressed so far. Then a measuring current is impressed which is designed to cause a voltage drop in the first participant, as seen from the central unit, (i. e. a participant arranged closest to the central unit) of the group of participants not addressed so far. Thereafter an address data signal is applied to the warning-system primary line. That participant, to which no address has been assigned so far and which previously detected a voltage drop, takes this address data signal into its address memory. Subsequently the short-circuit signal is allocated for the purpose of further addressing, wherein the short-circuit switch of the participant addressed before is not closed but rather the short-circuit switches of all participants not addressed so far are activated. When the measuring current is being impressed, it generates a voltage drop, which is to be detected, in that participant of the group of participants not addressed so far which is now arranged closest to the control unit, such that this participant, in the next phase in which an address data signal is applied to the warning-system primary line, stores this address in its address memory and is thus also addressed. This process is continued until the last participant is addressed.

This known method proceeds from the ideal assumption that due to short-circuiting of the two wires of the warning-system primary line the overall measuring current flows via the short-circuit switch of that participant of the group of participants not addressed so far that is arranged closest to the central control unit. In the practice, electronic switches, which are used as short-circuit switches in the known method, have an on-resistance which is not negligible. Therefore a portion of the measuring current flows through the short-circuit switch of this adjacent participant not addressed so far and generates a voltage drop across the participant's resistors. It is thus necessary not only to take into account the fact that a voltage drop has been detected but also to detect the magnitude of this voltage drop. Further, it must be taken into consideration that, the farther away a participant not addressed so far is arranged from the central control unit, the more the measuring current and thus the detectable voltage drop are reduced, one very reason for this being the fact that the measuring current must flow via the closed short-circuit switch of a participant located relatively far away from the central control unit via the resistors arranged in the wires of the warning-system primary line of the participant already addressed and disposed before the former participant. Evaluation and reliable detection of the voltage drops according to the known method are thus not trivial and involve high circuit complexities and programming effort.

WO-A-02/069149 describes a method for identifying nodes in a bus of a vehicle air conditioner, wherein each node is defined by the connection of a bus with a bus participant. For identification purposes, all participants feed an identifying current into the bus, wherein the currents are sensed in the nodes. On the basis of the value of the current in a node the position of the node along the bus and thus the participant connected to the respective node can be identified. This known method is carried out in one single step and requires a relatively complex current detection process with a relatively high resolution for identifying the individual nodes on the basis of the different currents.

A method similar to this method is described in EP-A-0 843 260.

It is an object of the invention to provide a method for addressing the participants of a bus system, which ensures reliable automatic addressing of the participants of a bus system at as low a circuit expenditure as possible.

According to the invention, this object is achieved with a method for addressing the participants of a bus system, wherein in the method each participant not addressed so far feeds an identifying current for identifying purposes into the bus, wherein all identifying currents flow through the bus towards the control unit, each participant not addressed so far detects the current flowing through the bus, only that participant not addressed so far, which does not detect any current or merely detects a current which is smaller than a predeterminable threshold value, is identified as a participant not addressed so far, an address for addressing purposes is assigned to the thus identified participant (possibly after verification of the identification), and the above steps are carried out, without the respective participant addressed last, until all participants not addressed so far are addressed.

With the aid of the method according to the invention the participants of in particular a serial bus system can be automatically addressed. For this purpose, the addressing procedure is automatically carried out by the control unit of the bus system. For addressing purposes, several cycles are carried out, wherein the number of addressing cycles is at least equal to the number of addressable participants of the bus system. During each addressing cycle exactly one participant is identified and addressed, wherein the identification can be verified, e. g. by carrying out the identification process at least twice and assigning an address to the participant only when the identification results correspond with each other.

At the beginning of the addressing process all participants not addressed so far feed an identifying current into the node of the bus, namely the connecting point between bus and participant. This means that at different locations of the bus currents of different magnitudes flow. Thus, between the last participant connected to the bus at a location farthest away from the control unit, when looking at the bus from the control unit, and the participant located before the former participant, a current flows which equals the identifying current. Between the penultimate and the antepenultimate participant a current flows which is twice as large as the identifying current. Finally, between the first participant and the control unit a current flows which equals the sum of all identifying currents.

Each addressable participant of the bus system detects the current flowing through its node. According to the invention, the identification of a participant not addressed so far is carried out in that the magnitude of the detected current is checked in each participant. If, for example, for each participant the current is measured behind the node, when looking at the bus from the control unit, a participant not addressed so far can be identified in that the current value detected by said participant is smaller than a threshold value. This participant is the last participant connected to the bus at a location farthest away from the control unit, when looking at the bus from the control unit, and not addressed so far. To the participant identified in this way an address is assigned by the control unit either directly after the participant has been identified or after verification of the identification by another identification and comparison of the two identification results. This address can now be stored in the participant. The participant addressed last does not partake in the next addressing cycle. Consequently, in the next addressing cycle the last participant connected to the bus at a location farthest away from the control unit, when looking at the bus from the control unit, and not addressed so far is identified. This process is continued until all participants not addressed so far are addressed.

Above, that participant not addressed so far has been identified which measures a current which is smaller than a threshold value. If the current measurement or current detection is carried out before the node, when looking at the bus from the control unit, the last participant located farthest away from the control unit also measures a current when the identifying currents are fed, namely the identifying current fed by this very participant. In this case the last participant not addressed so far can be identified in that the current detected by said participant is smaller than twice the value of the identifying current.

In the above description of the method according to the invention it is assumed that during an addressing cycle no currents, with the exception of the identifying currents, flow through the bus. In the practice, this is not always guaranteed and not desirable since the participants of a bus system, inter alia, impress quiescent currents into the bus for the purpose of configuring an interference-immune bus and, in this manner, hold the bus at a defined potential at its node. In the prior art, bus systems exist where both addressable and non-addressable participants are connected to a bus. For example, in the case of a vehicle air conditioner addressable participants are employed for driving actuators, such as servomotors, while non-addressable (standard) participants comprise sensors (for example, pollutant sensor, temperature sensor, humidity sensor, sun sensor). The non-addressable participants (standard participants) do not comprise any addressing logics, i. e. they are not addressable via the control unit. In most cases the feeding of quiescent current cannot be stopped in these standard participants.

For addressing a bus system comprising addressable participants and non-addressable participants it is thus suggested according to an advantageous variant of the invention, to carry out a current measurement, during which the quiescent currents flowing on the bus are detected, prior to the identifying-current detection. Each participant not addressed so far stores the amount of quiescent current flowing through the node associated with said participant. When the identifying currents have been fed, that participant not addressed so far is identified which, while the identifying currents are being fed by all participants not addressed so far, does not detect any current difference or merely a current difference which is smaller than a predeterminable second threshold value as compared with its previous detection. The control unit can then assign an address to the participant identified in this manner.

With the aid of the variant of the inventive method described below automatic addressing can be carried out in a bus system whose addressable participants feed quiescent currents into the bus during the addressing process. Thus at the beginning of an addressing cycle each participant not addressed so far feeds a quiescent current into the bus. Then each participant not addressed so far detects the quiescent current flowing through the node. Each participant stores the corresponding current value. Next, the identifying currents should be impressed by each participant not addressed so far. However this can lead to such a high current load acting upon the bus in the case of a relatively large number of participants that the allowable current loads are exceeded. Therefore, in this variant of the invention it is checked whether participants not addressed so far exist which detect a differential quiescent current already exceeding a predeterminable third threshold value. If this is the case, it is assumed that, when looking at the bus from the control unit, behind the last participant of the participants not addressed so far, which have detected a quiescent current exceeding the third threshold value, participants not addressed so far exist. Since the identification of a participant not addressed so far is effected from the rear end of the bus, as seen from the control unit, those front participants not addressed so far, which have detected a current exceeding the third threshold value during the quiescent-current detection, need not partake in the further identification process. These front participants do no longer feed an identifying current into the bus. In other words: only part of the group of participants not addressed so far feeds an identifying current into the bus, which is advantageous in that it need no longer be worried about the maximum allowable current load of the bus being exceeded. The identification of the participants not addressed so far and feeding identifying currents is then carried out as described above.

Finally, the method according to the invention allows a bus system to be addressed which comprises non-addressable participants and addressable participants. Since in each phase of the addressing process the quiescent current fed by the non-addressable participants flows through the bus of this bus system, these quiescent currents are first detected in the individual nodes at the beginning of an addressing cycle. The quiescent-current values thus detected are stored by the participants not addressed so far. Subsequently the quiescent currents are fed by the participants not addressed so far. Now, with regard to minimizing the current load, it is selected again in the manner described above which of the participants not addressed so far partake in the further identification and addressing process. Thus, here again those participants not addressed so far are determined, which detect a current value exceeding a fifth threshold value while all participants not addressed so far feed the quiescent currents. This fifth threshold value is advantageously equal to the aforementioned third threshold value. Then only those participants not addressed so far still partake in the addressing process, which, when looking at the bus from the control unit, are arranged behind the last participant not addressed so far which has detected a current value exceeding the fifth threshold value during the quiescent-current detection. The participants not addressed so far and still partaking in the addressing process now feed identifying currents into the bus, wherein that participant not addressed so far of this group is identified which detects a current which, as compared with the stored current value, does not show any current difference or merely a current difference which is smaller than a predeterminable sixth threshold value. The control unit can then assign an address to the participant thus identified.

The assignment of an address by the control unit is carried out either by targeted transmission to the identified participant or by transmitting the same address to all participants not addressed so far prior to the identification, wherein only the subsequently identified participant accepts the address as its own address, i. e. the remaining participants not addressed so far do not accept this address transmitted to them. Prior to assignment of the address a verification cycle for verifying the identification can be carried out.

Above, a current detection has been discussed in conjunction with the description of the invention. Of course, this current detection can be substituted by a voltage detection, or a voltage detection can be carried out prior to the current detection. The current detection is effected by determination of the voltage drop across e. g. a shunt resistor, wherein such one shunt resistor of the bus is assigned to each addressable participant. As a result, all shunt resistors are connected in series along the bus.

Hereunder the invention is explained in detail on the basis of two embodiments. In the drawings.

Figure 1:
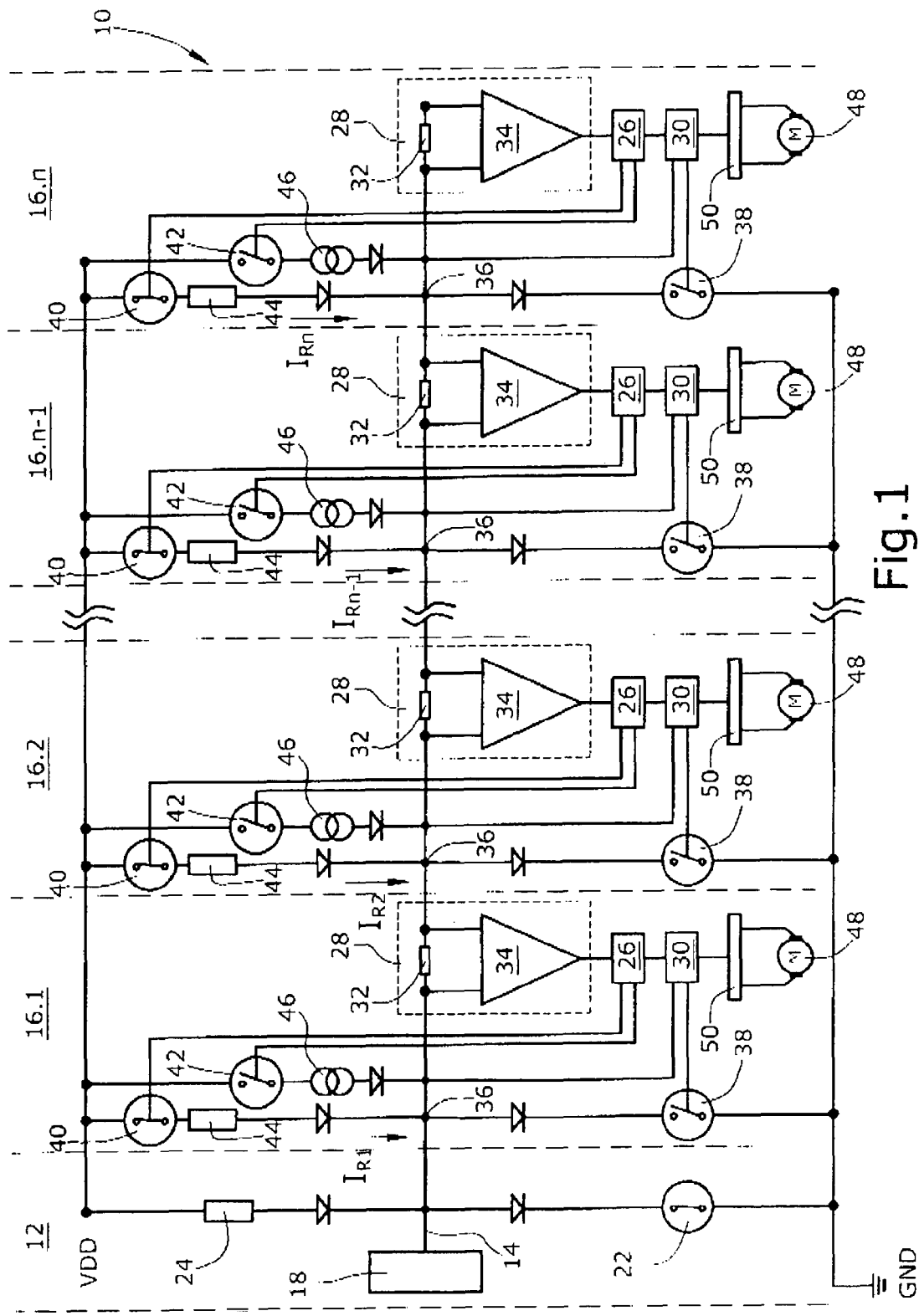
FIGS. 1 to 6 show various phases of a first bus system during an automatic addressing process according to a first embodiment of the invention.

FIG. 1 shows the setup of a serial bus system 10 (e. g. LIN-bus). The bus system 10 comprises a control unit 12 (master) to which a bus 14 is connected. Along the bus 14 a plurality of addressable participants 16 (slaves) are connected to said bus 14. All participants 16 and the control unit 12 are connected to a VDD-potential and a ground potential (GND) and can, at option, apply said potentials to the bus 14.

The control unit 12 comprises a control circuit shown at 18 which applies control and addressing signals to the bus 14 and/or receives signals from the participants 16 via the bus 14 and drives a switch 20,22 with the aid of which the bus 14 is connectable via the control unit 12 with GND. Between VDD and the bus 14 a pull-up resistor 24 is located.

All participants 16 of the bus system 10 shown in FIG. 1 are equipped with an addressing logic 26 which is connected with a detector 28 and a control circuit 30. The control circuit 30 is connected with the bus 14, and the detector 28 measures, via a shunt resistor 32 located in the bus 14, the current flowing through the bus 14, in the area of the participant concerned, as a voltage drop which is amplified via an amplifier 34. Other variants of the detector 28 are also possible, provided that the detector 28 is in a position to measure the current flowing through the bus 14 in the area of the connecting node 36 of a participant 16.

The control circuit 30 further controls a switch 38 in each participant, while the switches 40,42 of each participant are controlled by the participant's addressing logic 26. The switch 38 connects, at option, the bus 14 with GND, while the switch 40 places the bus 14 via a pull-up resistor 44 to VDD, and the switch 42 connects the bus 14 with a current source 46 which feeds into the bus 14 an identifying current $I_I$ required for identifying a participant 16. Instead of a current source 46 a pull-up resistor may be arranged, provided that the VDD-potential is stable. In this embodiment the participants 16 drive respective actuating members 48 assigned to the participants, said actuating members 48 being connected via an interface 50 with the control circuit 30 of the participant 16 concerned. With the aid of the pull-up resistors and the switch 40 (in the closed state) the bus 14 is placed to VDD-potential in the area of each participant 16. When the switch 40 is closed, a quiescent current $I_R$ is fed into the bus 14. The connection of the bus 14 with VDD via the pull-up resistors 44 results, inter alia, in an interference-immunity of the bus 14, which is known for bus applications of the kind discussed here.

For the sake of completeness it should be said that in all connecting lines of the control unit 12 and the participants 16 comprising the aforementioned switches inverse-polarity protection diodes are provided which however, like the switches 38 of the participants 16, are of no importance for the automatic addressing process described below.

The initial situation for addressing the participants 16 is shown in FIG. 1. The switch 22 of the control unit 12 and the switches 40 of the participants 16 are closed, while the switches 38 of the participants 16 remain open all the time. In this situation, the participants 16, which are designated below 16.1, 16.2, 16.$n$-1 and 16.$n$ to allow better distinction between the participants (wherein n is the total of all participants), feed quiescent currents $I_{R1}, \ldots I_{Rn}$. It should be noted here that feeding of quiescent current during the addressing process is not absolutely necessary. If no quiescent current is fed, merely the switch 22 of the control unit 12 is closed at the beginning of the addressing process, while all other switches of the control unit 12 and the participants 16 are open.

When quiescent current is fed, currents of different magnitudes flow at the level of the different participants 16 through the bus 14, said currents being detected with the aid of the detectors 28. The quiescent currents flow from the connecting nodes 36 of the participants 16 to the control unit 12 where the quiescent currents flow off to GND. Due to arrangement of the detectors 28 behind the connecting nodes 36 (when looking at the bus 14 from the control unit 12), the detector 28 of the participant 16.$n$ connected to the bus 14 at a location farthest away, as seen from the control unit 12, does not detect any quiescent current, the detector 28 of the participant 16.$n$-1 detects the quiescent current $I_{Rn}$, the detector 28 of the participant 16.2 detects a quiescent current which is equal to the sum of the quiescent currents $I_{R3}$ to $I_{Rn}$ of the participants 16.3 (not shown) to 16.$n$, and finally the detector 28 of the participant 16.1 detects a quiescent current which is equal to the sum of the quiescent currents $I_{R2}$ to $I_{Rn}$. The respective currents detected by the participants 16.1 to 16.$n$ during this phase are stored in the addressing logic 26.

Figure 2:
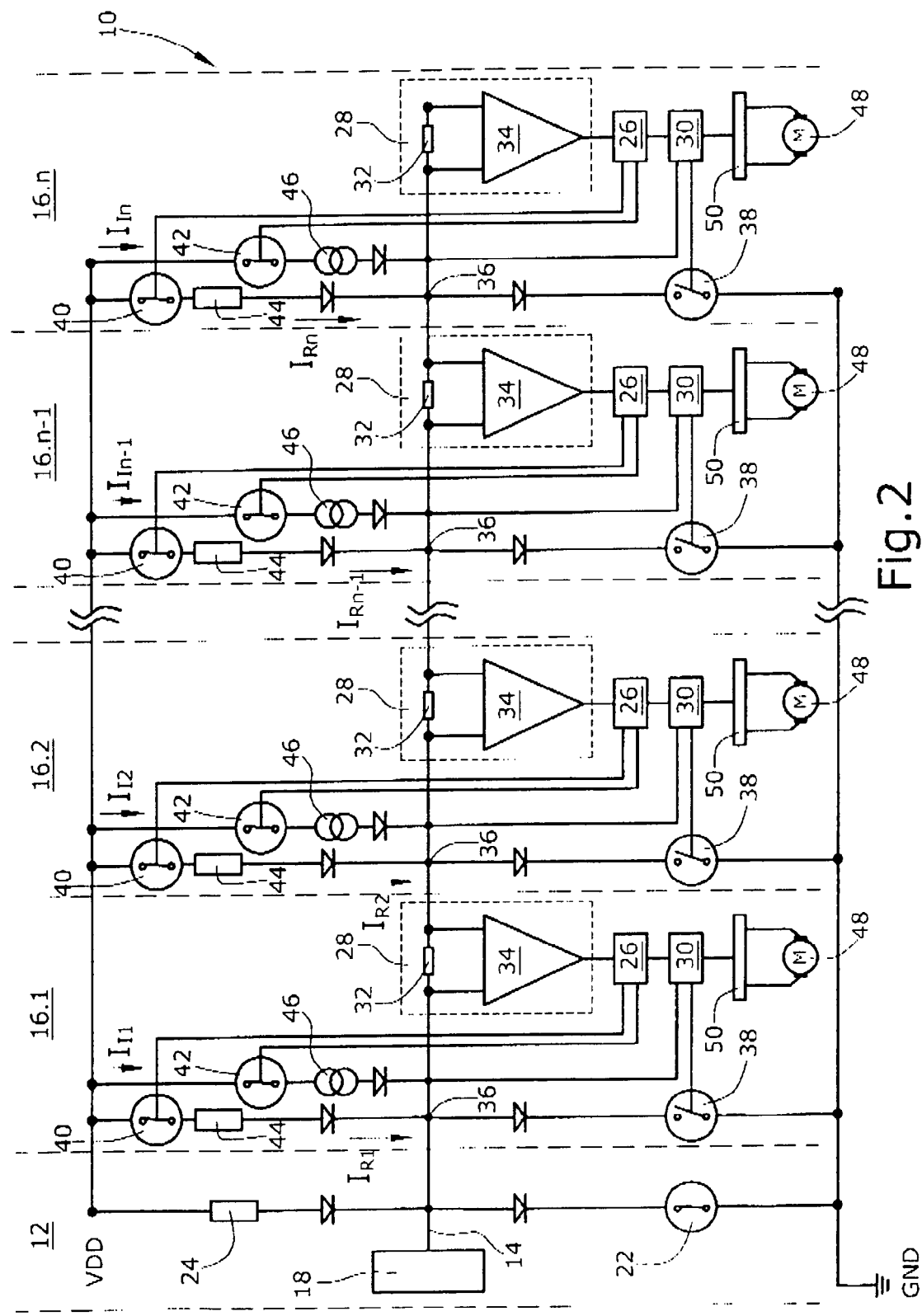
Figure 3:
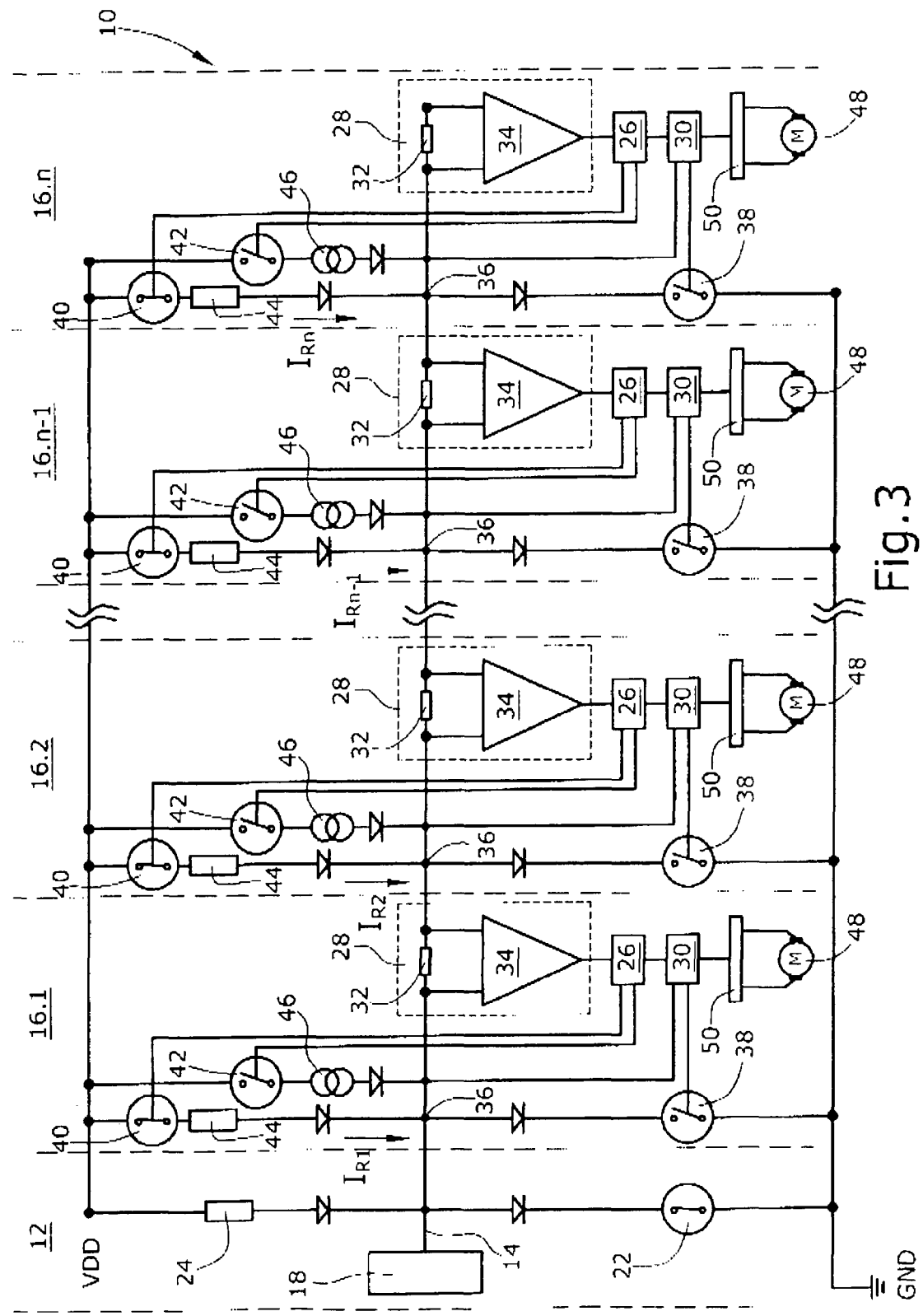

After a defined period of time the participants 16 not addressed so far close their switches 42 (i. e. at the beginning of the addressing of all participants—see FIG. 2). As described above in conjunction with feeding of the quiescent currents, currents with different magnitudes occur after feeding of the addressing currents $I_{I1}$ to $I_{In}$ in the individual sections of the bus 14, which currents are detected by the detectors 28. Apart from the detector 28 of the last participant 16.$n$, all other participants 16.1 to 16.$n$-1 now detect a current on the bus 14, said current exceeding the value previously measured and stored in the addressing logic 26 by the magnitude of an identifying current (the identifying currents of all participants have the same magnitude). In other words: the participant 16.$n$ is identifiable.

If in the next step the control unit 12 applies an addressing signal to the bus 14, this signal is accepted only by the participant 16.$n$ and placed into the addressing logic 26 of this participant.

The participant 16.$n$ addressed in this manner does not partake in the further addressing process.

As already explained above, the addressing process does not require measurement of the quiescent current. Thus in the addressing logic 26 of the participants 16 no current values are stored when feeding of the identifying current begins. The participant to be addressed during the first addressing cycle can then be identified by its detector 28 not detecting any current flow despite the fact that an identifying current is being fed.

When the current detection in each participant 16 is carried out before its connecting node 36 (when looking at the bus 14 from the control unit 12), identification of a participant to be identified in an addressing cycle is effected by the detector 28 of this participant detecting a current equal to the identifying current, while the other participants detect a current which is at least twice as large as the identifying current. In this manner, a participant can be identified.

Above, the first addressing cycle of the automatic addressing process has been described for a case in which the control unit 12 applies, after identification of a participant, an addressing signal to the bus 14. Alternatively, it is also possible to apply the addressing signal to the bus prior to the identification, and to store said signal in the addressing logic 26 of all participants 16. In this case, only the identified participant accepts the previously received addressing signal as its own address, while this addressing signal is deleted in the addressing logics 26 of the other participants.

After termination of the first addressing cycle the addressed participant 16.$n$ does no longer partake in the further process, i. e. the switch 42 of the participant 16.$n$ remains open. This situation is illustrated in FIG. 2. In the manner described above, the participant 16.$n$-1 can be identified and thus addressed.

Figure 4:
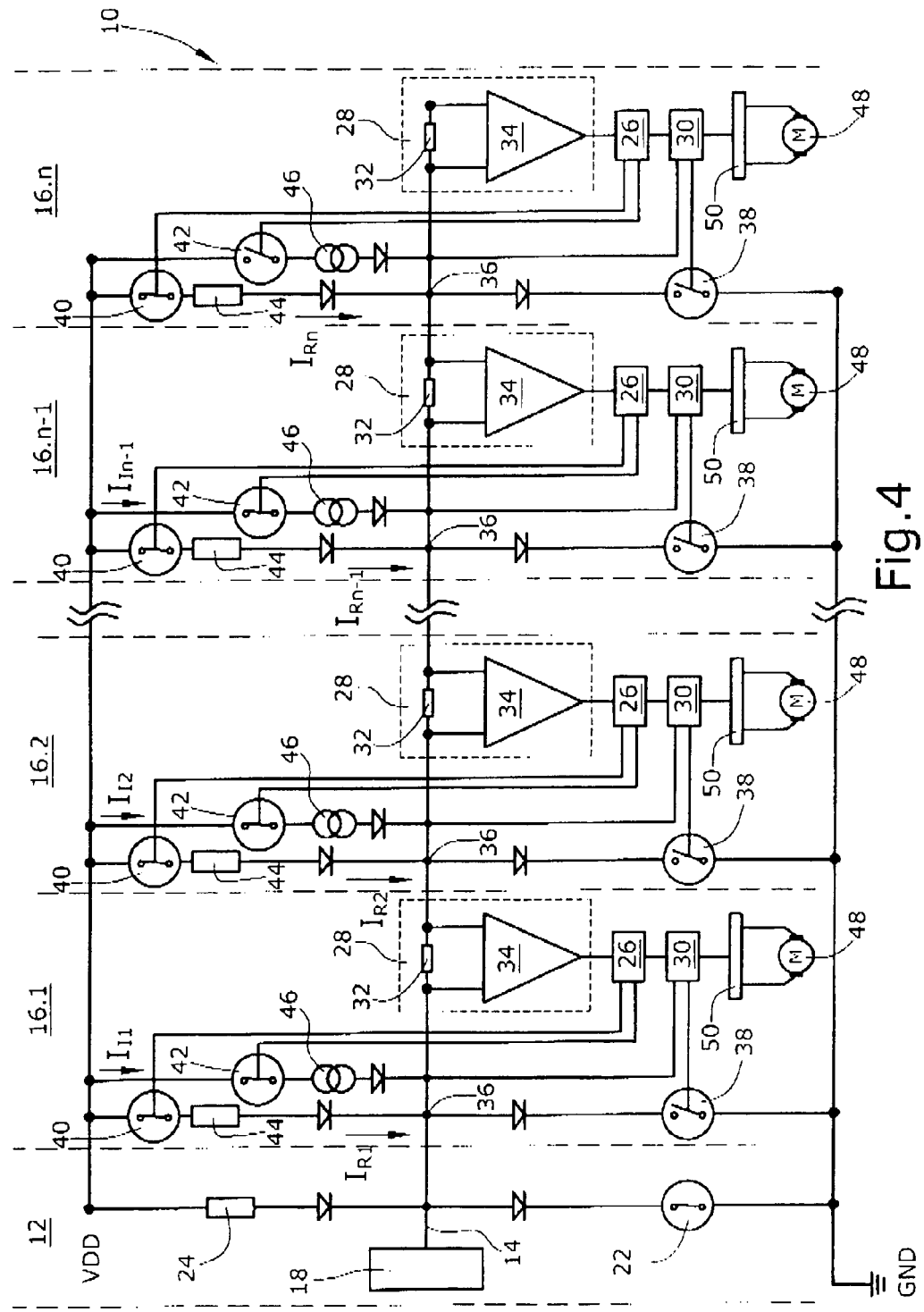
Figure 5:
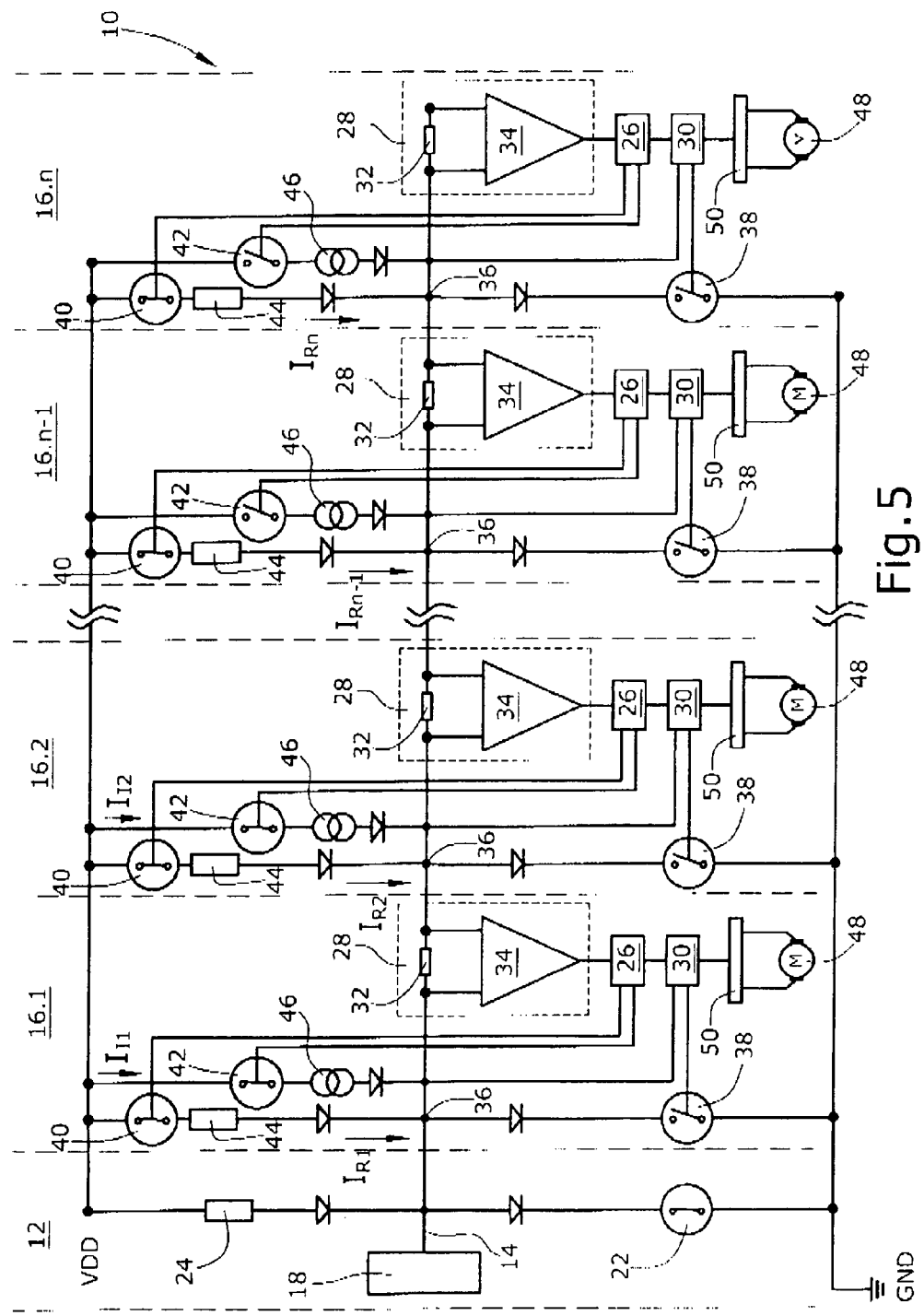
Figure 6:
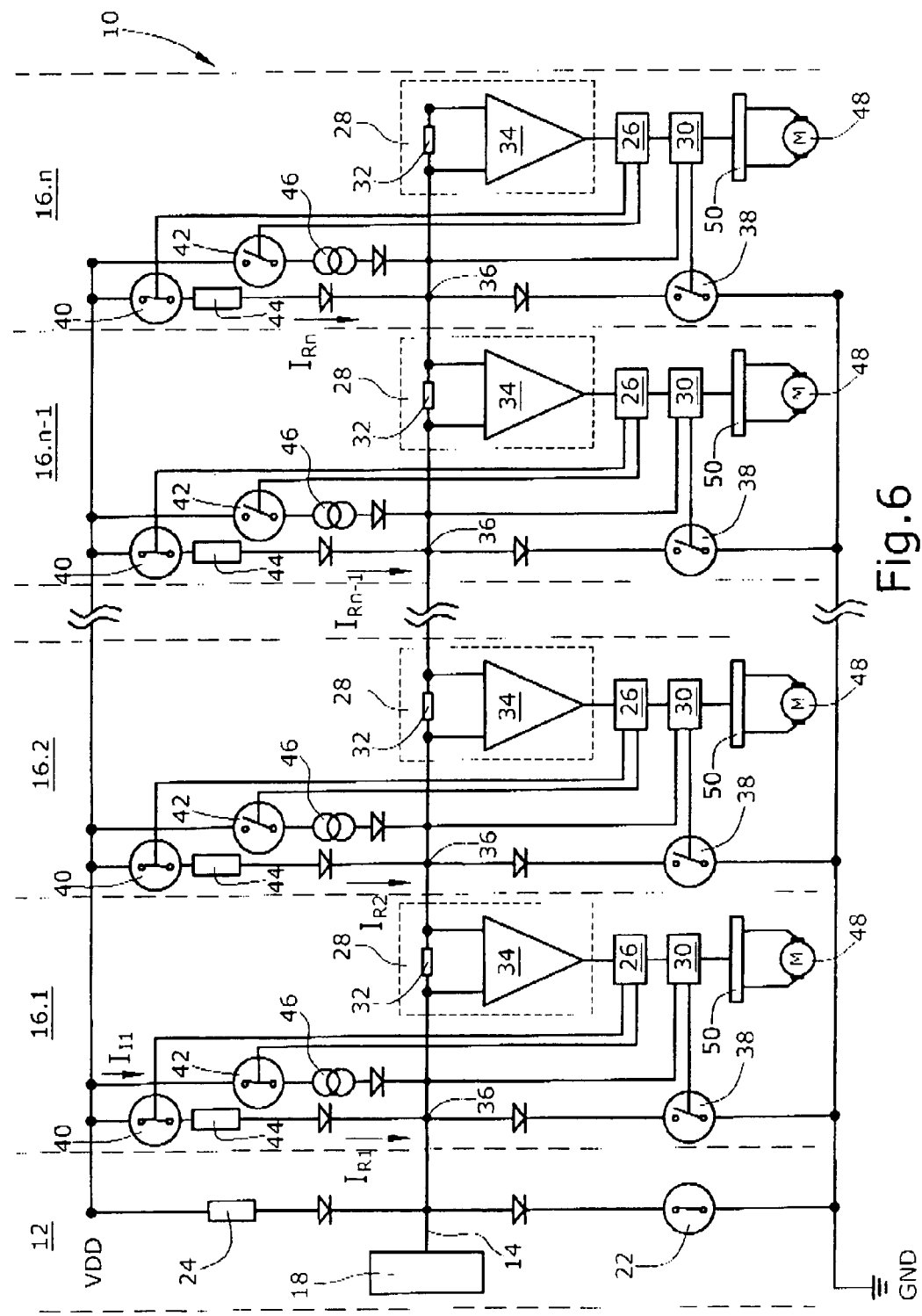

The process described above is continued until all participants are identified. The relevant states of the bus system 10 for identifying and addressing the participants 16.2 are illustrated in FIGS. 4 and 5, while FIG. 6 shows the states for identifying and addressing the participant 16.1. FIGS. 4 and 6 show the respective switch positions during feeding of identifying current, while FIG. 5 shows the switch positions after identification of a participant 16.2. The situation after identification of the participant 16.1 corresponds to that shown in FIG. 1.

With reference to FIGS. 7 to 10 an alternative addressing concept is described below. The setup of the bus system 10 shown in these Figs. is identical with the setup of the bus system 10 shown in FIGS. 1 to 6 such that the same reference numerals are employed.

In the addressing process shown in FIGS. 7 to 10 it is taken into account that the current flowing on the bus 14 does not exceed a predetermined maximum value. This boundary condition exists, for example, in LIN-bus applications.

Figure 7:
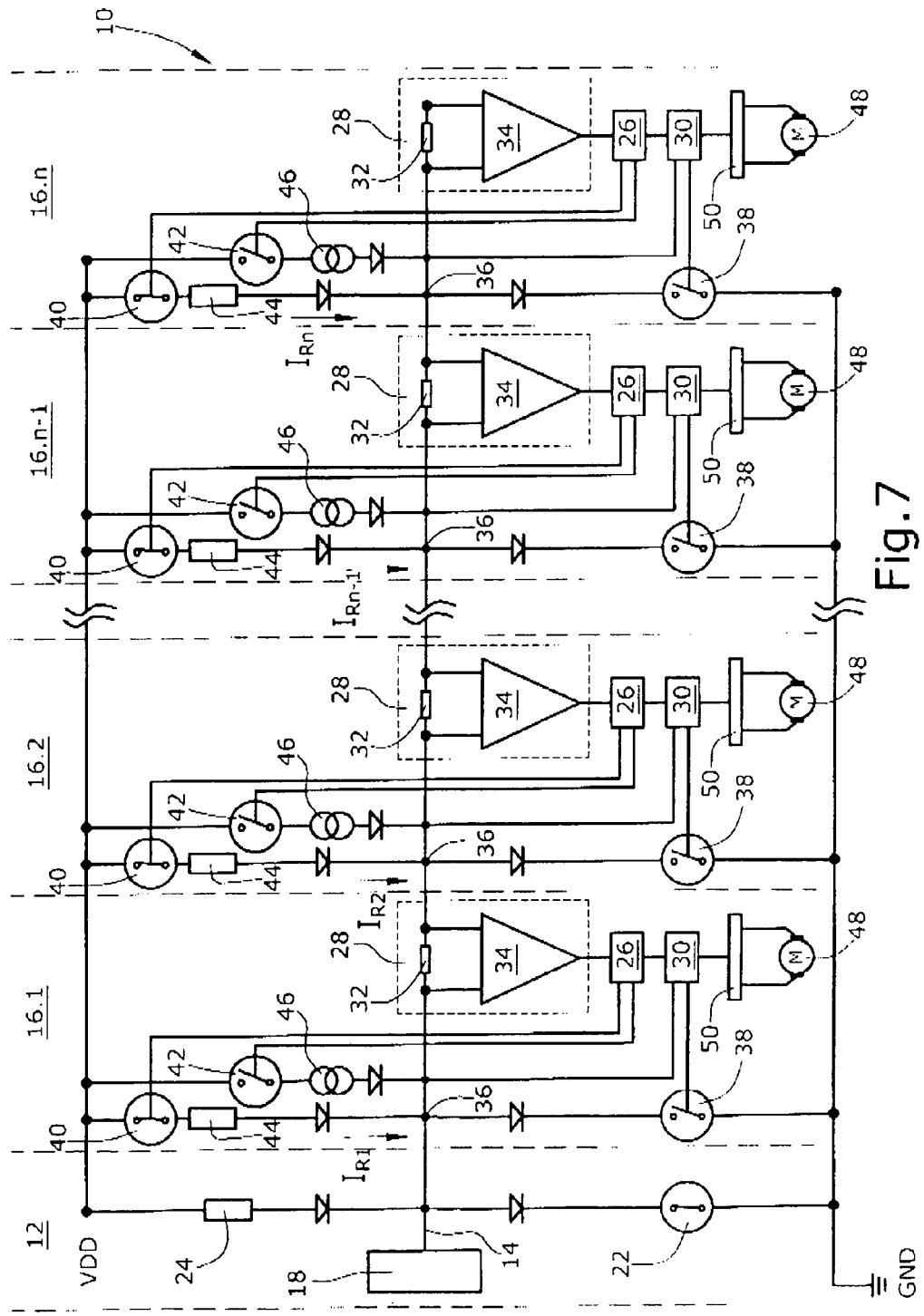
FIGS. 7 to 10 show various phases of a first bus system during an automatic addressing process according to a second embodiment of the invention.

The initial situation for addressing according to this alternative process is shown in FIG. 7. All participants 16 feed their quiescent currents.

In a first phase, each participant 16 detects the respective current flowing through the bus 14. If this current detected by at least one participant exceeds a predetermined threshold value, this fact is interpreted to the effect that participants not addressed so far are connected behind this participant, when looking at the bus 14 from the control unit 12, such that the said participant and all participants connected to the bus 14 between this participant and the control unit 12 do no longer partake in the further addressing process.

Figure 8:
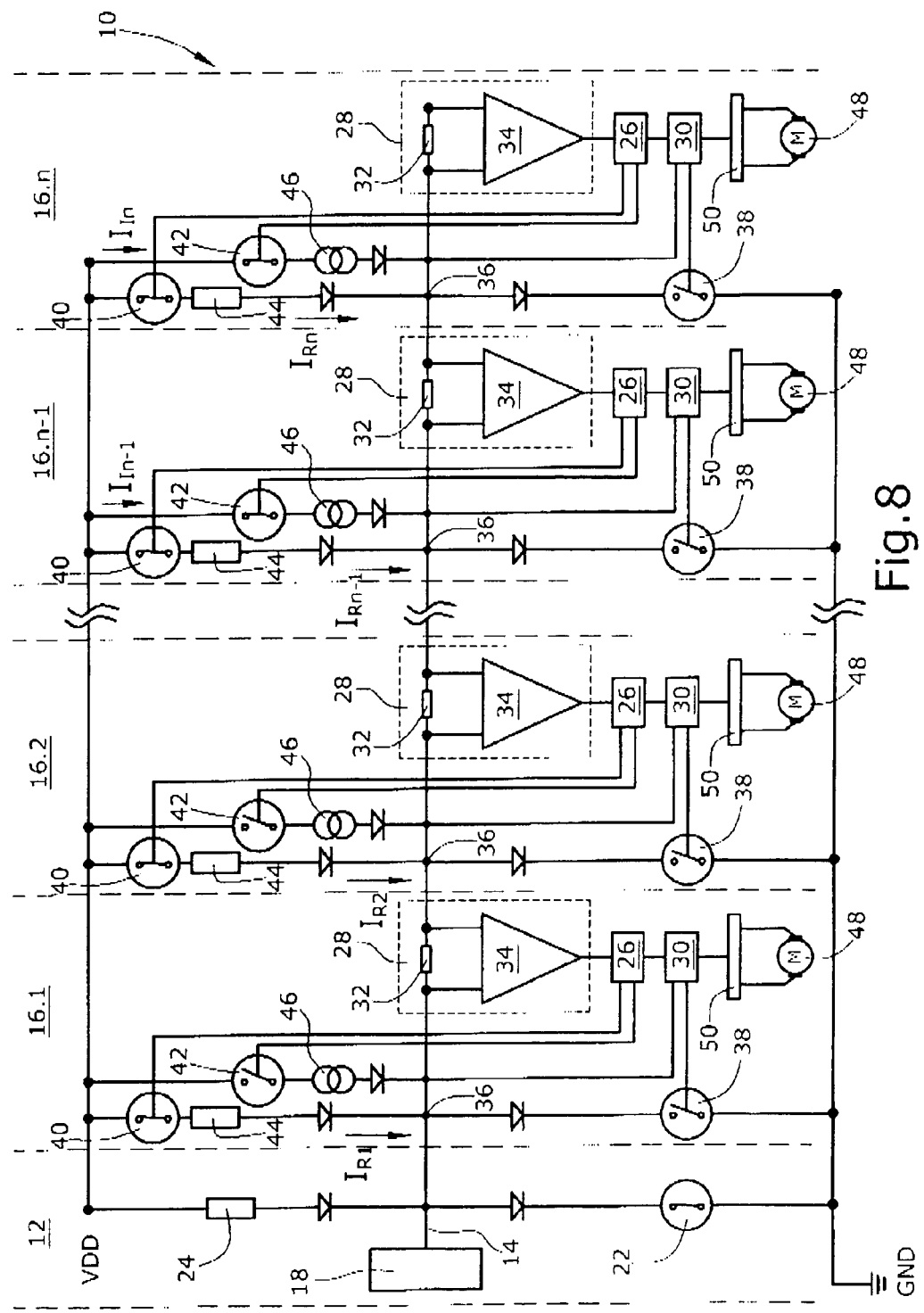

This situation is explained with reference to FIG. 8. It is assumed that, as shown in FIG. 7, the participant 16.2 has detected in the bus 14 a current exceeding a threshold value. Therefore the participants 16.1 and 16.2 do not partake in the subsequent feeding of identifying current, such that identifying currents from the participants 16.3 (not shown) to 16.$n$ are fed. The identification within this group of participants feeding identifying currents is then carried out in the manner described above, wherein in the first addressing cycle the participant 16.$n$ is identified and an address can be assigned to this participant. During the next identifying cycle the switch 42 of the participant 16.*n* remains open all the time.

Figure 9:
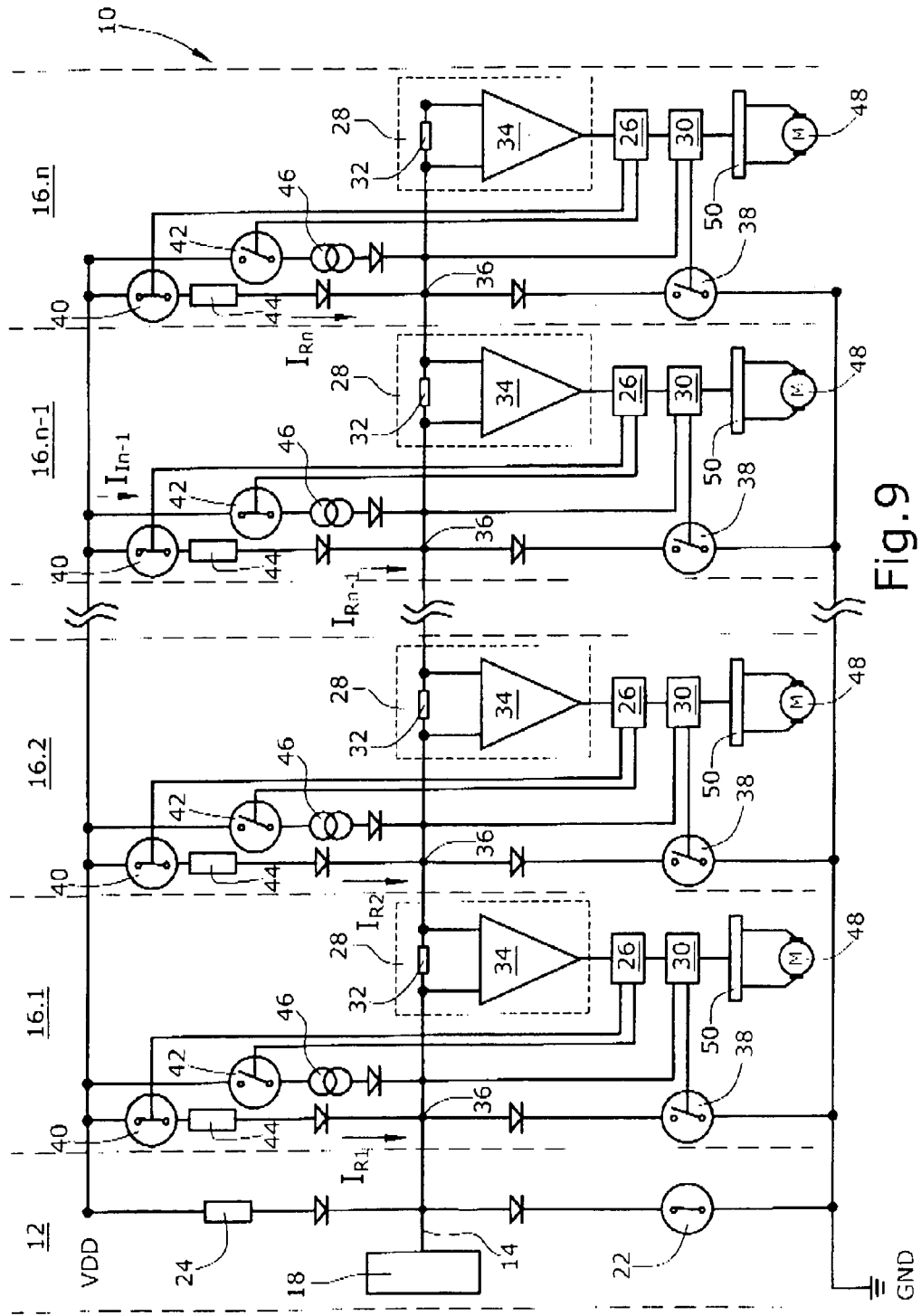
Figure 10:
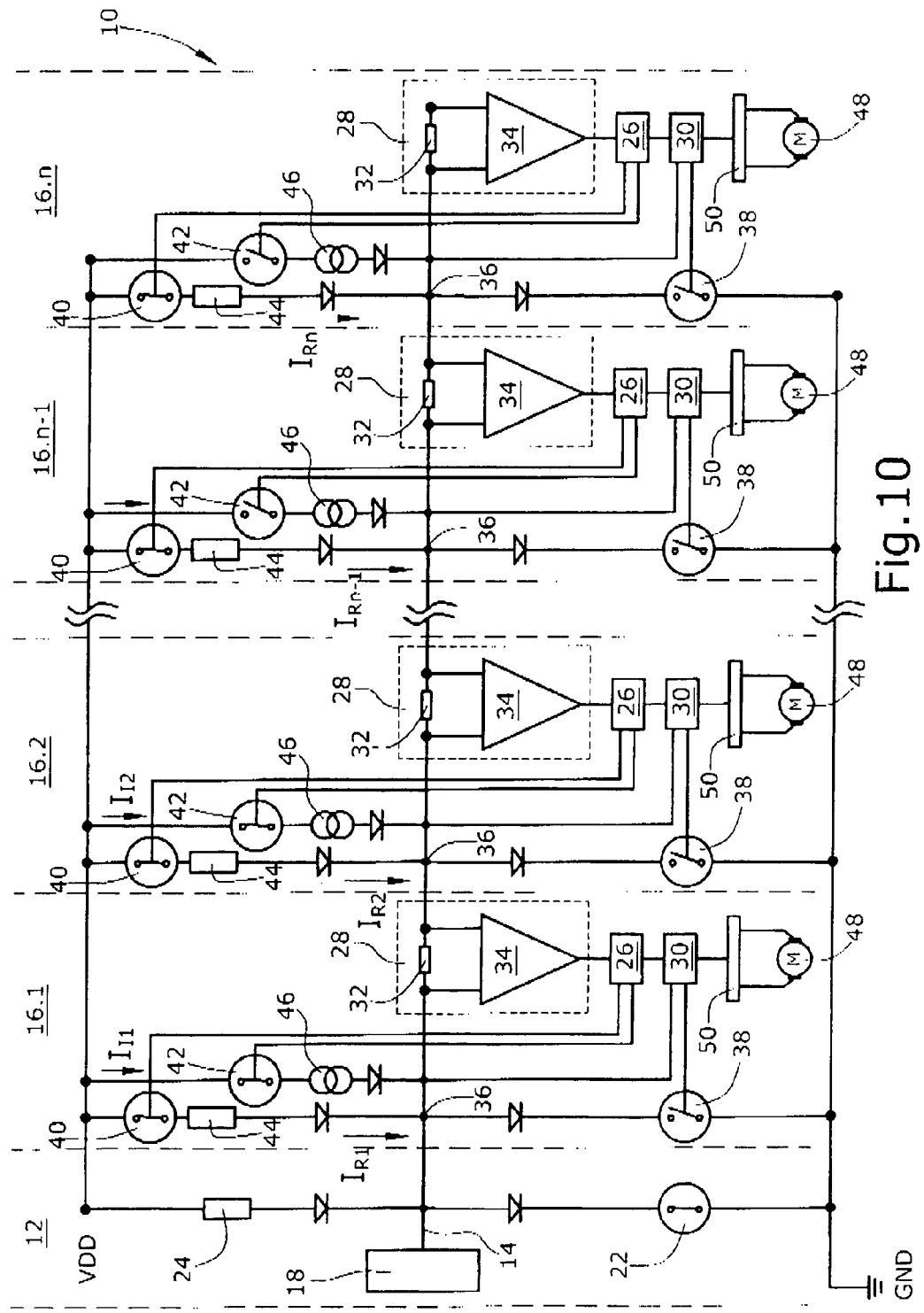

Again, at the beginning of the next identifying cycle all participants 16.1 to 16.*n*-1 not addressed so far feed their quiescent currents (FIG. 9). It should be assumed that during this addressing phase, too, the participant 16.2 detects a current exceeding a threshold value, such that, as has already been described in conjunction with the first addressing cycle, the participants 16.2 and 16.1 do not partake in the further addressing process in the second addressing cycle. The identification and addressing during this second cycle are then carried out in the manner described above and result in identification and/or addressing of the participant 16.*n*-1.

The process described above is continued until a situation occurs in which the participant 16.2 does no longer detect a current value exceeding the threshold value while quiescent current is being fed. If this situation occurs for the first time during the addressing process, the participant 16.1, instead of the participant 16.2, detects a current still exceeding the threshold value while all participants feed their quiescent current. The participant 16.2 then partakes in the identifying and addressing cycle (see FIG. 10) like the participants connected to the bus 14 behind the participant 16 when looking at the bus 14 from the control unit 12. The participant 16.1 however does not partake in this process step.

With reference to FIGS. 11 to 17 a third embodiment of a bus-addressing process is described below, which is applicable to a bus comprising, besides the addressable participants, as described in conjunction with the bus systems 10 shown in FIGS. 1 to 10, standard participants not addressable with the aid of the method according to the invention, of which standard participants one is illustrated as participant 16.3 in FIGS. 11 to 17. Each standard participant permanently feeds a quiescent current into the bus 14. Such a standard participant has, for example, a sensor 52 connected thereto which is connected with the control 54 of the standard participant.

Figure 11:
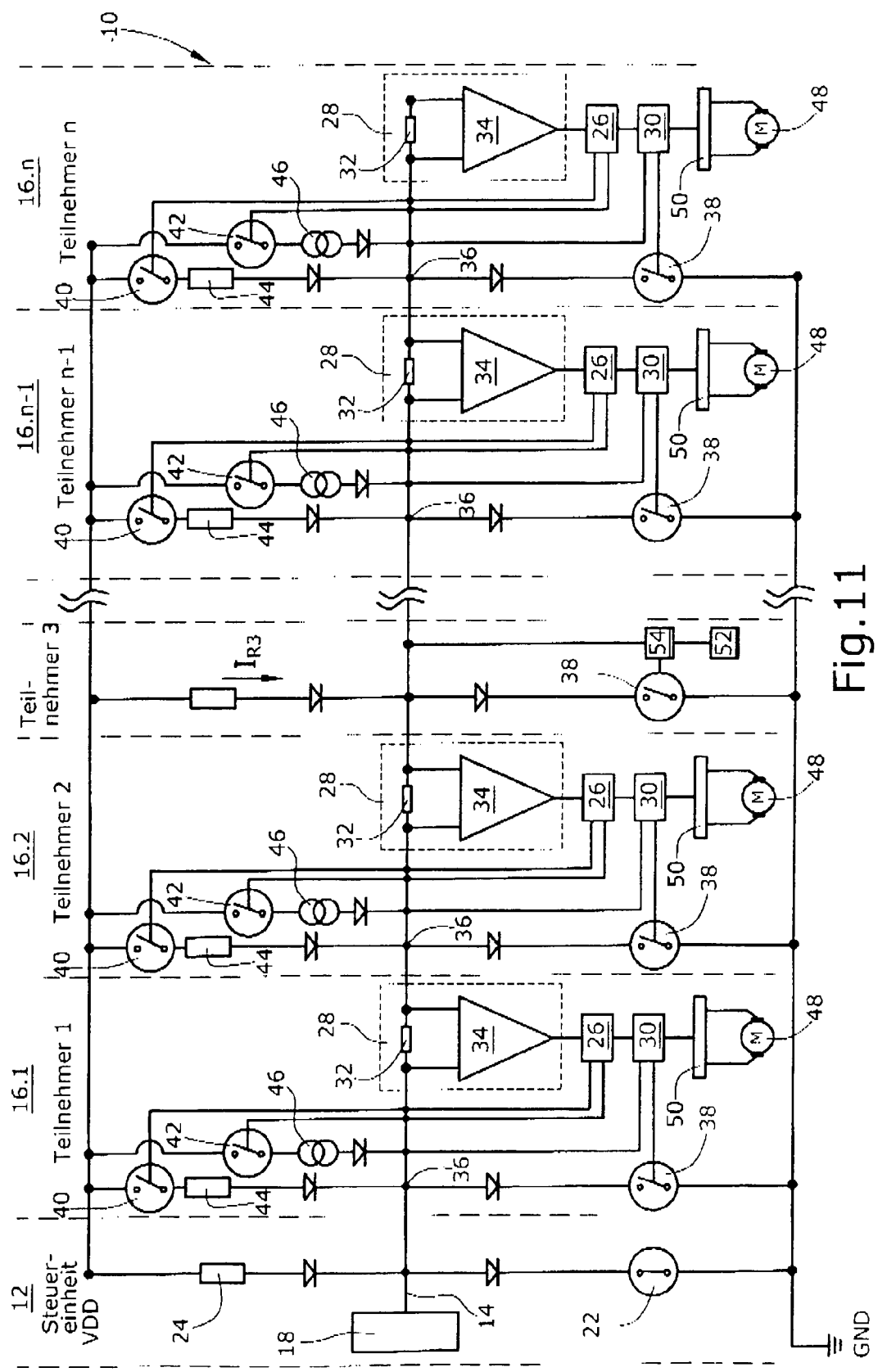
FIGS. 11 to 17 show various phases of a second bus system during an automatic addressing process according to another embodiment of the invention.

The invention is advantageous in that the addressing process is also applicable to bus systems comprising a "mixture" of participants as can be seen from the following description. First, as is illustrated in FIG. 11, the base load on the bus 14 is detected, which load is generated by the standard participants feeding their quiescent currents (in FIG. 11 only the standard participant 16.3 is shown whose quiescent current is $I_{R3}$). The detectors 28 of the addressable participants (the standard participants do not comprise such a detector 28) then detect current values which are placed into the addressing logics 26 of these addressable participants.

Figure 12:
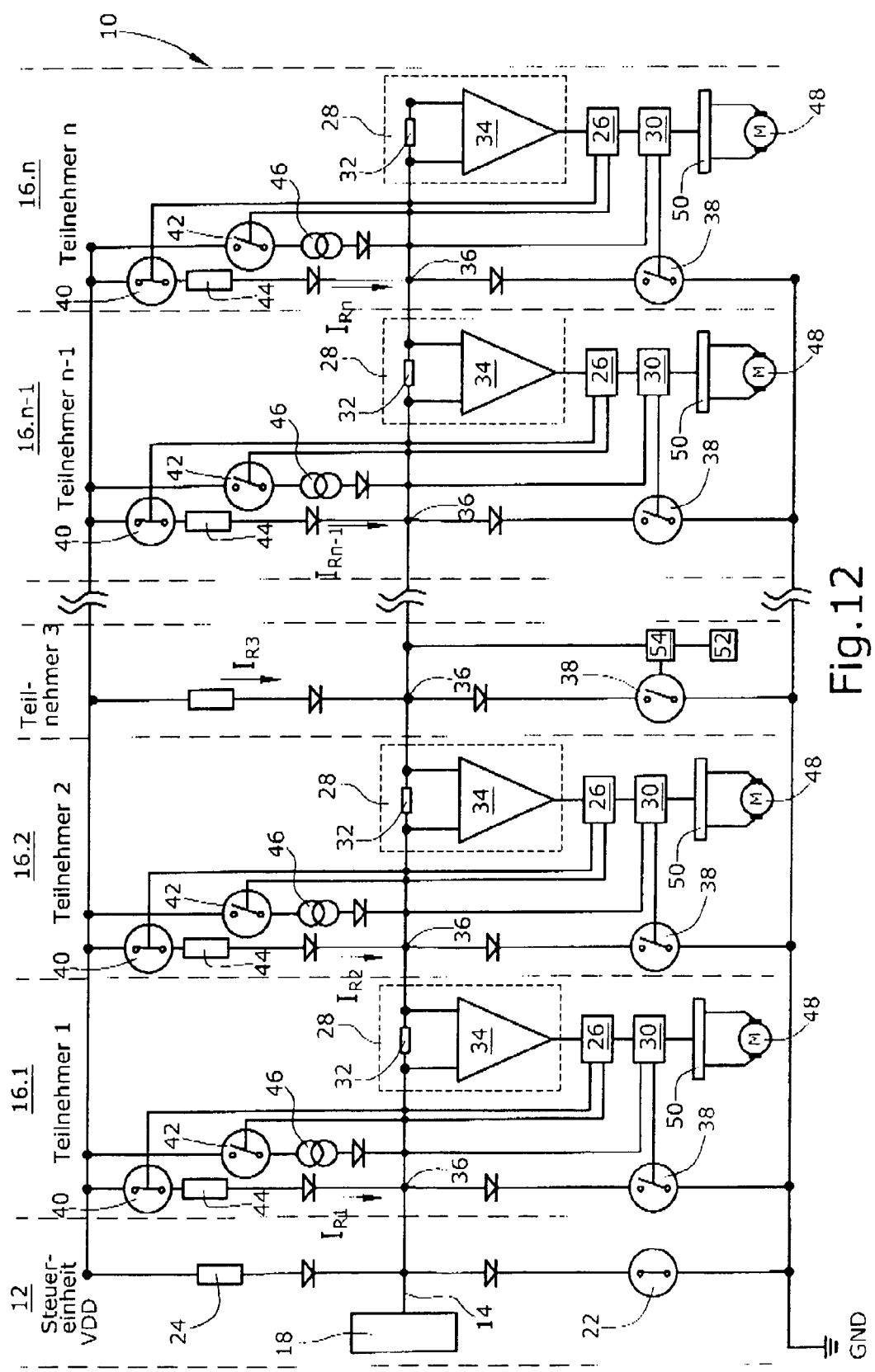
Figure 13:
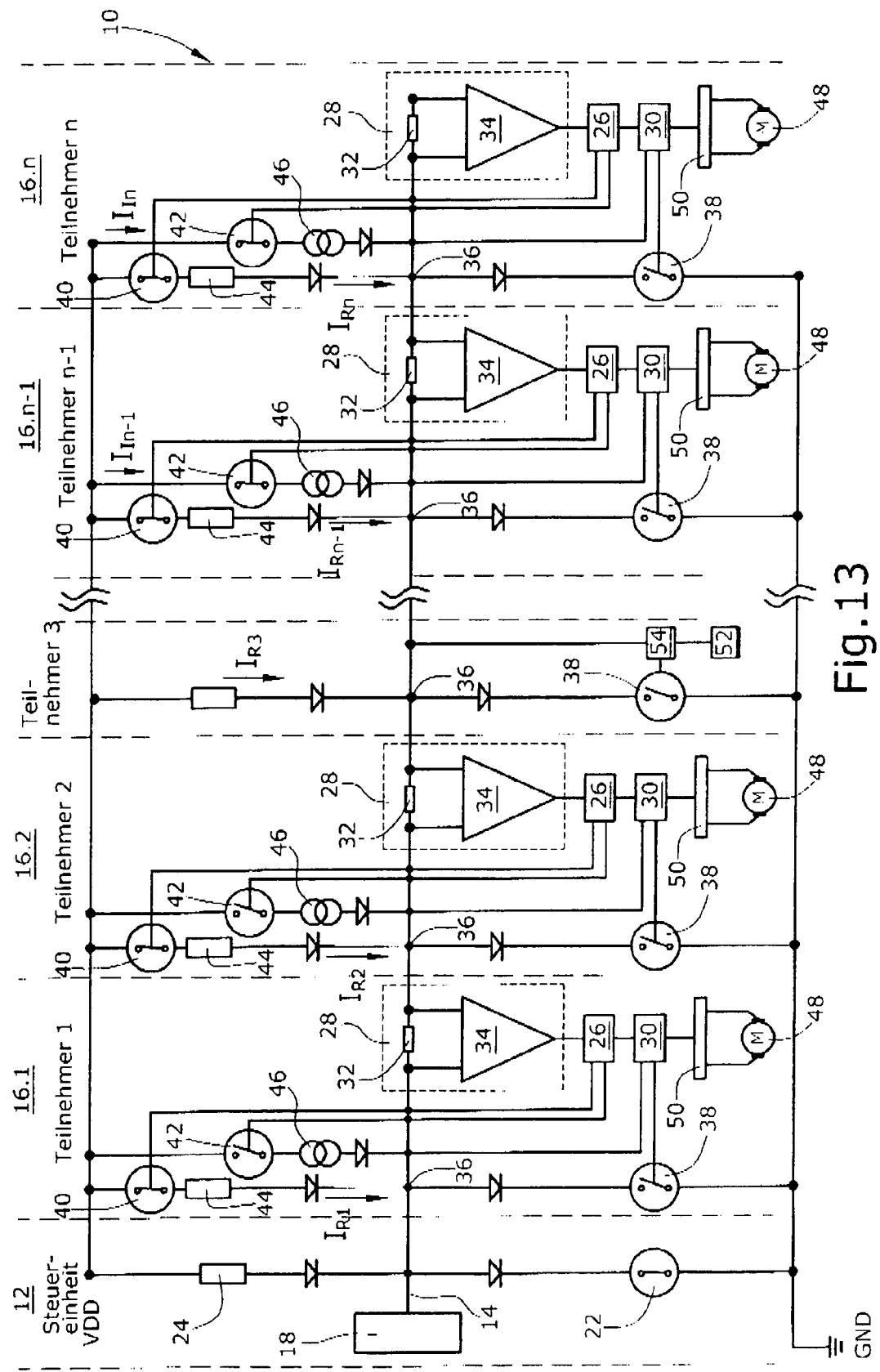
Figure 14:
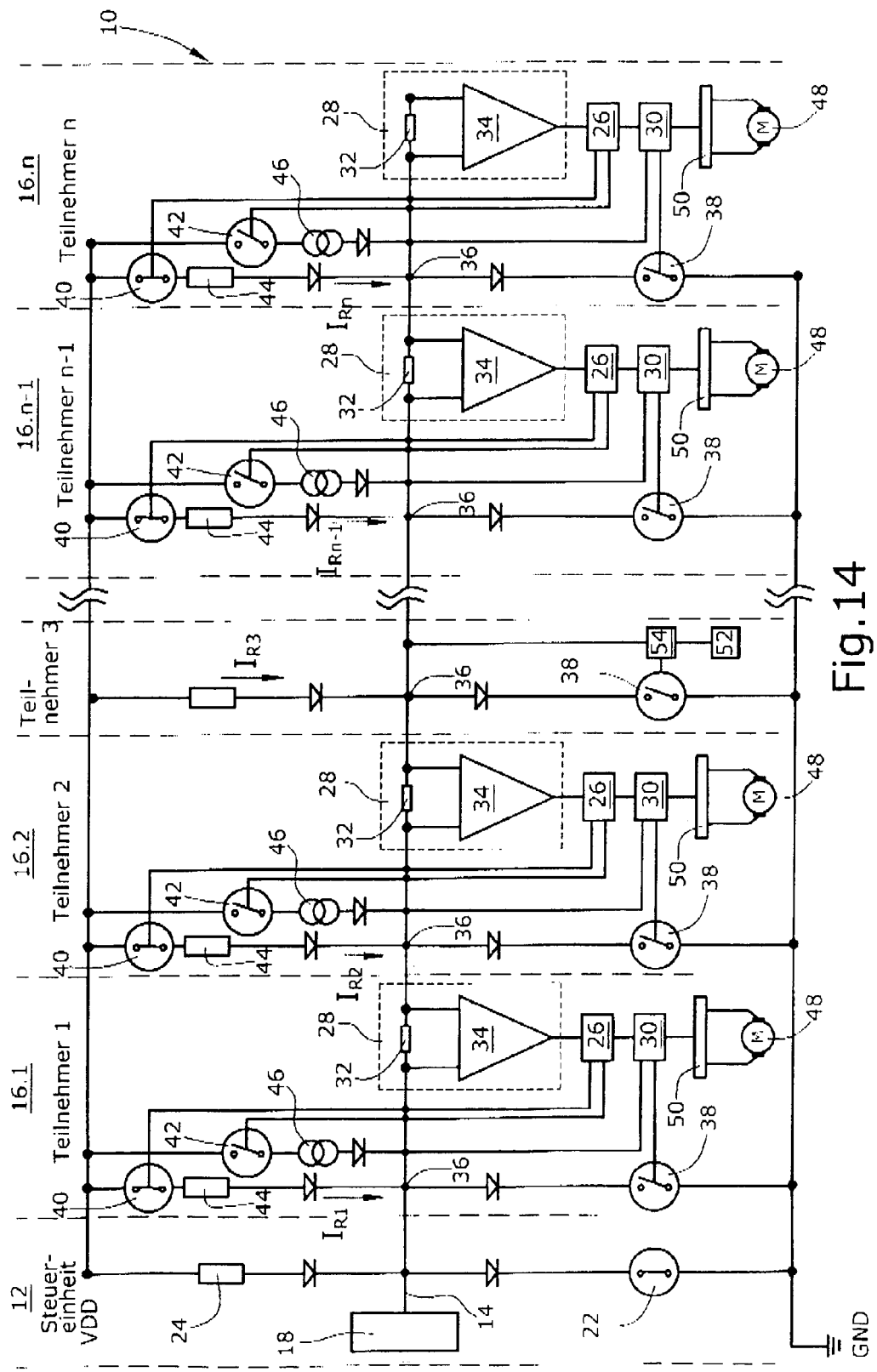

Subsequently (FIG. 12) the addressable participants (16.1, 16.2, 16.*n*-1 and 16.*n* are shown in FIG. 12) feed their quiescent currents. Now a check with a view to preventing overloading of the bus 14 (in terms of current) is carried out, which overloading would occur if in the following step identifying currents of all addressable participants were fed. In the case described here it is assumed that the addressable participant 16.2 detects a current exceeding a predetermined threshold value while all addressable and non-addressable participants are feeding their quiescent currents. Further, an addressable participant arranged behind the participant 16.2 is to be that addressable participant which is connected to the bus 14 at a location farthest away from the control unit 12, when looking at the bus 14 from the control unit 12, and also detects a quiescent current exceeding the threshold value. According to the above process description (see FIGS. 7 to 10) the addressable participants 16.1 and 16.2 do at first not partake in the addressing process.

Subsequently (see FIG. 13) the addressable participants connected to the bus behind the participant 16.2 feed their addressing currents. According to the description made with reference to FIGS. 1 to 6 the participant 16.*n* is then identified as the addressable participant and is subsequently addressed. This participant does then no longer partake in the following addressing cycles.

It should be assumed that in the next addressing cycle (see FIG. 14) the participant 16.2 still detects a quiescent current exceeding the threshold value. Thus the participants 16.1 and 16.2 continue to no longer partake in this addressing cycle.

Figure 15:
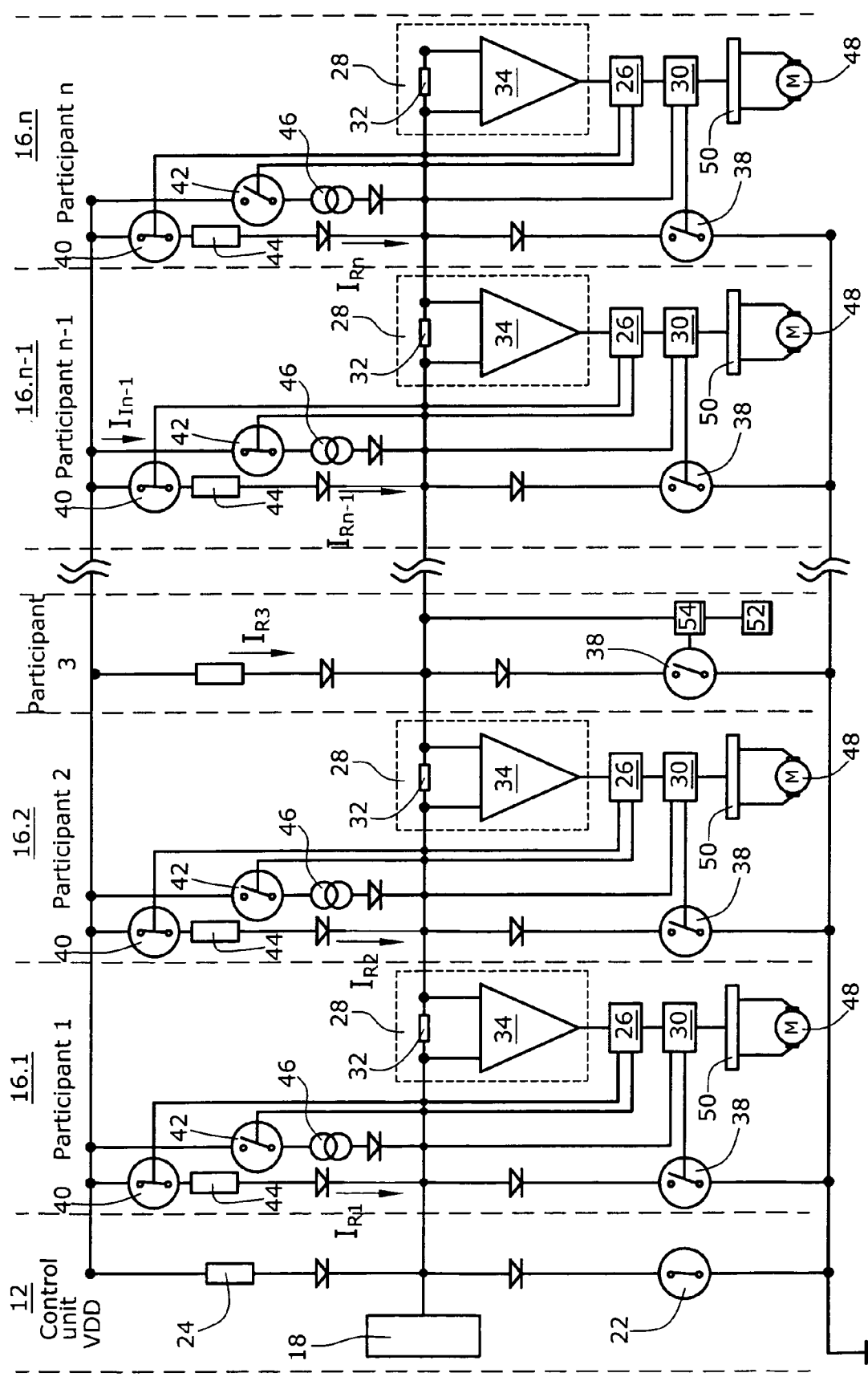

In the manner described above, the participant 16.*n*-1 can be identified and addressed in this second addressing cycle (see FIG. 15).

Figure 16:
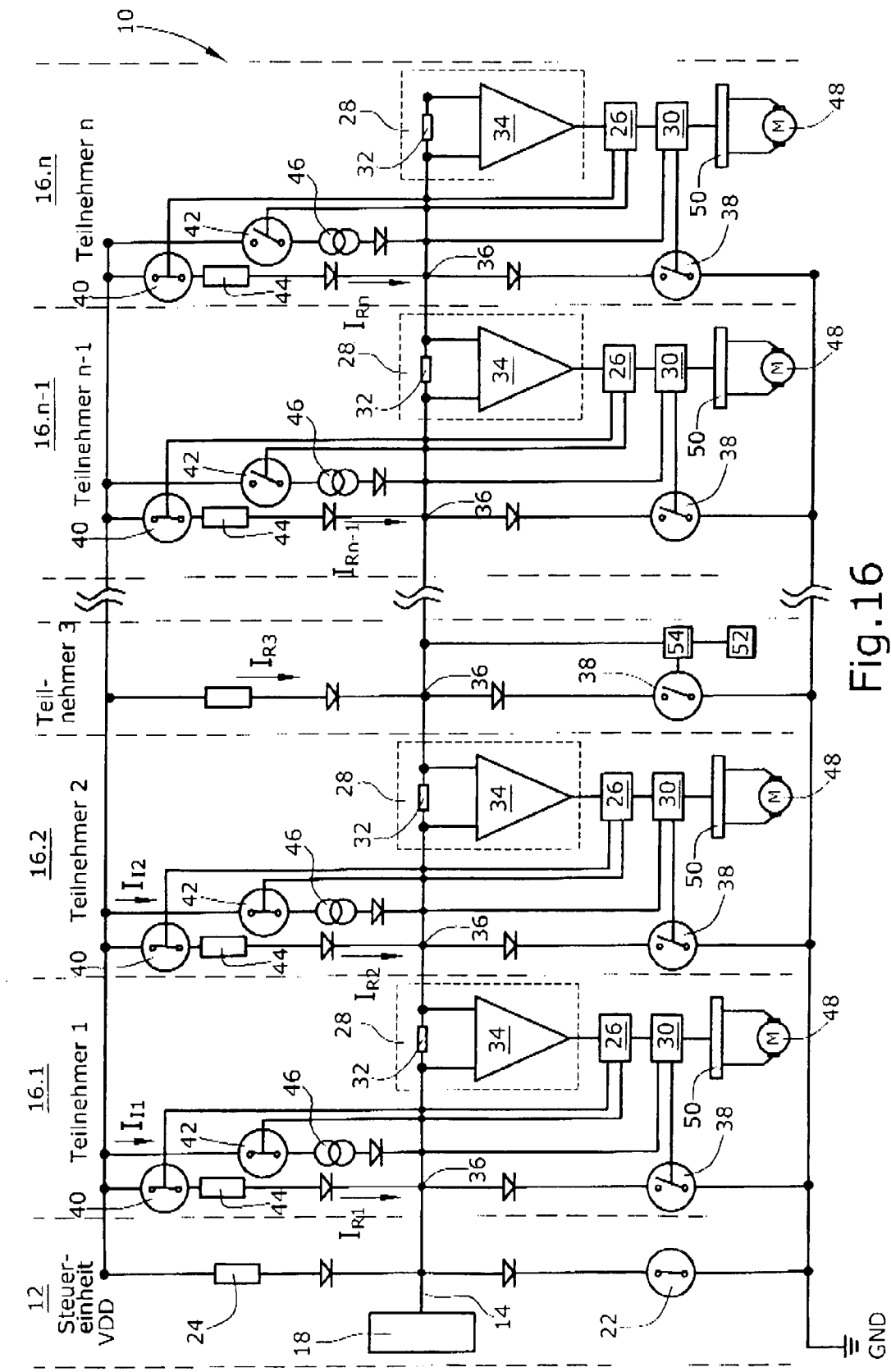
Figure 17:
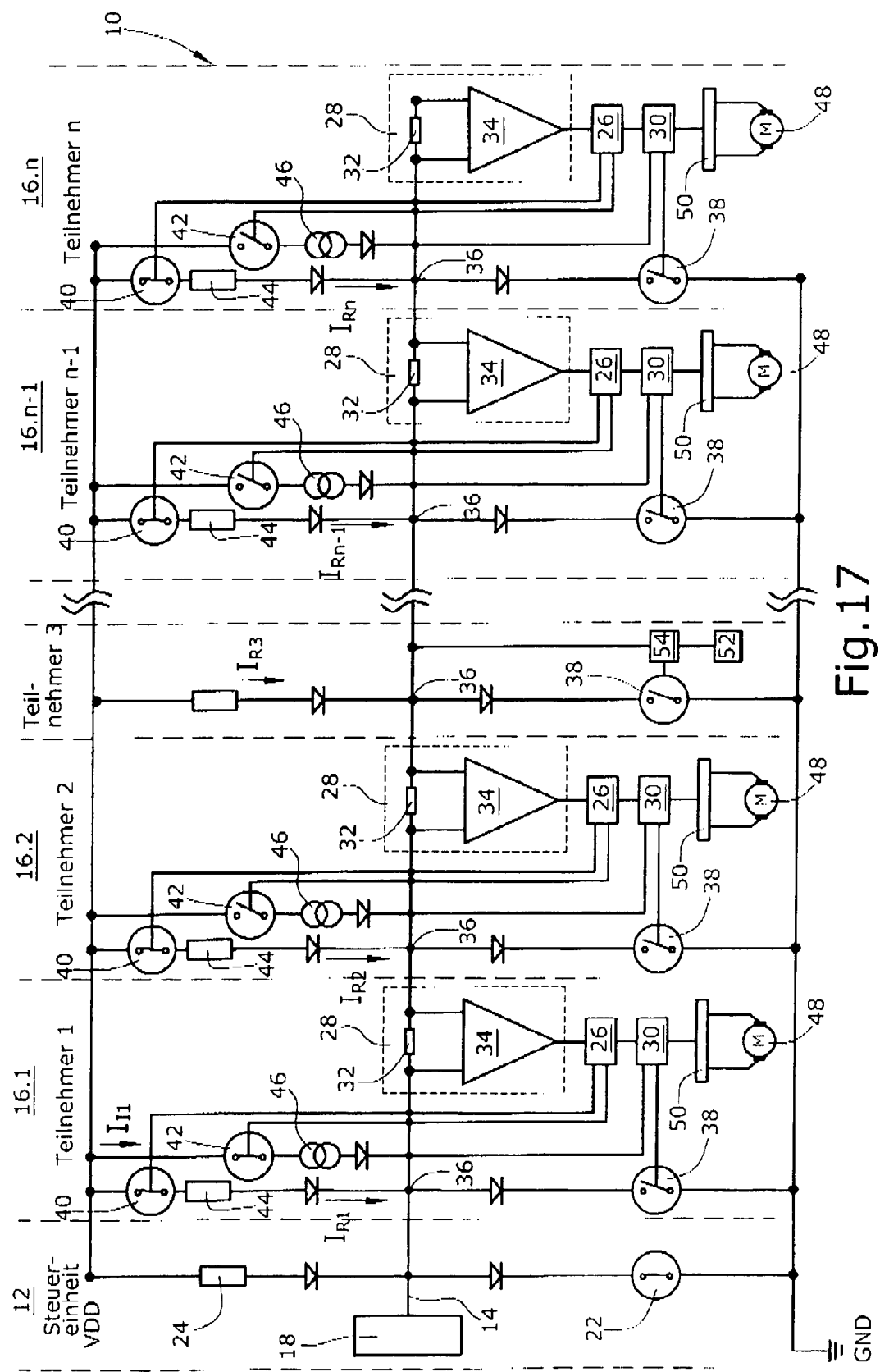

During the further addressing process a situation as shown in FIG. 16 occurs. It should be assumed that in this situation none of the participants yet to be addressed detects a current exceeding the threshold value when all participants not addressed so far and not addressable feed their quiescent current. Thus the participants 16.1 and 16.2 partake in the identifying and addressing process and feed their identifying currents into the bus 14.

It should be assumed further be assumed that the participant 16.2 is, at that time, that participant not addressed so far which is connected to the bus 14 at a location farthest away from the control unit 12. Thus this participant 16.2 is identified in this cycle since its detector 28 detects, while the quiescent current $I_{I2}$ is being fed, a current equal to the quiescent current which this detector 28 has detected when, at the beginning of the addressing process, all non-addressable participants fed their quiescent currents.

In a further addressing step (see FIG. 17) the participant 16.1 is identified and addressed.

Basically, in the method according to the invention batch variations, different technologies/manufacturers/setup of the electronic evaluation unit, temperature influences, level shifts for bus, VDD and GND advantageously do not exert any or exert merely little influence. Foreign participants, i. e. participants which cannot partake in the evaluation process since the method according to the invention has not been implemented may be connected to the bus at any place without the addressing process being affected.

The invention claimed is:

1. Method for addressing the participants of a bus system comprising a control unit, a bus starting from the control unit and a plurality of addressable participants connected to the bus, wherein in the method each participant not addressed so far feeds an identifying current for identifying purposes into the bus, wherein all identifying currents flow through the bus towards the control unit, each participant not addressed so far detects the current flowing through the bus, only that participant not addressed so far, which does not detect any current or merely detects a current which is smaller than a predeterminable first threshold value, is identified as a participant not addressed so far, an address for addressing purposes is assigned to the thus identified participant, and the aforementioned steps are carried out, without the respective participant addressed last, until all participants not addressed so far are addressed.

2. Method according to claim 1, characterized in that the bus has connected thereto, besides the addressable participants, at least one participant not addressable which feeds a quiescent current into the bus, each participant not addressed so far detects, prior to feeding the identifying currents, the quiescent current flowing through the bus, merely the participants not addressed so far feed the identifying currents into the bus, merely that participant not addressed so far is identified as a participant not addressed so far which, while the identifying currents are being fed by all participants not addressed so far, does not detect any current difference or merely detects a current difference which is smaller than a predeterminable second threshold value as compared with its previous detection, an address for addressing purposes is assigned to the participant thus identified, and the aforementioned steps are carried out, without the respective participant addressed last, until all participants not addressed so far are addressed.

3. Method according to claim 1, characterized in that each addressable participant feeds a quiescent current into the bus, each participant not addressed so far feeds a quiescent current into the bus, each participant not addressed so far detects the current fed as quiescent current and flowing through the bus, it is determined which of the participants not addressed so far detects a current exceeding a predeterminable third threshold value, merely those participants not addressed so far, which, while the quiescent currents are being fed, detect a current smaller than or equal to the third threshold value, feed identifying currents into the bus, from the group of these participants not addressed so far and feeding identifying currents only that participant is identified as a participant not addressed so far which does not detect any current or merely detects a current which is smaller than a predeterminable fourth threshold value, an address for addressing purposes is assigned to the participant thus identified, and the aforementioned steps are carried out, without the respective participant addressed last, until all participants not addressed so far are addressed.

4. Method according to claim 1, characterized in that the bus has connected thereto, besides the addressable participants, at least one participant not addressable which feeds a quiescent current into the bus, each participant not addressed so far detects, prior to feeding of the identifying currents, in a first current detection the current fed as quiescent current by all non-addressable participants and flowing through the bus, subsequently each addressable participant feeds a quiescent current into the bus, it is determined which of the participants not addressed so far detects a current exceeding a predeterminable fifth threshold value, merely those participants not addressed so far, which, while the quiescent currents are fed, detect a current smaller than or equal to the fifth threshold value, feed identifying currents into the bus, from the group of these participants not addressed so far and feeding identifying currents merely that participant is identified as a participant not addressed so far which does not detect any current difference or merely detects a current difference which is smaller than a predeterminable sixth threshold value as compared with the first detection, an address for addressing purposes is assigned to the participant thus identified, and the aforementioned steps are carried out, without the respective participant addressed last, until all participants not addressed so far are addressed.

5. Method according to one of claims 1 to 4, characterized in that the second threshold value and/or the fourth threshold value and/or the sixth threshold value are equal to the first threshold value, and/or that the fifth threshold value is equal to the third threshold value, or that all threshold values are identical.

6. Method according to claim 1, characterized in that the current detection in the participants is effected via shunt resistors of the bus assigned to the addressable participants, wherein all shunt resistors are connected in series along the bus.

7. Method according to claim 1, characterized in that instead of a current detection a voltage detection is carried out in the participants.

8. Method according to claim 1, characterized in that the assignment of an address is effected by transmitting an address to the identified participant or in that the same address is transmitted to all participants not addressed so far prior to identification of a participant, and merely the subsequently identified participant accepts this address as its own address.

9. Method according to claim 1, characterized in that the assignment of an address is effected after the first identification of a participant, or after verification of a participant, e. g. by another identification of the participant and comparison of the second identification with the first identification.

* * * * *